United States Patent
Wu

(10) Patent No.: US 9,119,218 B2
(45) Date of Patent: Aug. 25, 2015

(54) METHOD AND SYSTEM FOR CONTROLLING MACHINE TYPE COMMUNICATION EQUIPMENT TO ACCESS NETWORK

(75) Inventor: Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 539 days.

(21) Appl. No.: 13/521,995

(22) PCT Filed: Aug. 25, 2010

(86) PCT No.: PCT/CN2010/076336
§ 371 (c)(1),
(2), (4) Date: Jul. 12, 2012

(87) PCT Pub. No.: WO2011/127710
PCT Pub. Date: Oct. 20, 2011

(65) Prior Publication Data
US 2012/0294146 A1  Nov. 22, 2012

(30) Foreign Application Priority Data

Apr. 16, 2010  (CN) .......................... 2010 1 0151162

(51) Int. Cl.
*H04W 28/20* (2009.01)
*H04W 72/10* (2009.01)
(Continued)

(52) U.S. Cl.
CPC .......... *H04W 72/10* (2013.01); *H04W 74/0875* (2013.01); *H04W 4/005* (2013.01);
(Continued)

(58) Field of Classification Search
None
See application file for complete search history.

(56) References Cited

U.S. PATENT DOCUMENTS 5,729,542 A * 3/1998 Dupont ................... 370/346
2002/0110085 A1 8/2002 Ho et al.
(Continued)

FOREIGN PATENT DOCUMENTS

| CN | 1756405 A | 4/2006 |
|---|---|---|
| EP | 1215851 A2 | 6/2002 |

(Continued)

OTHER PUBLICATIONS

International Search Report in international application No. PCT/CN2010/076336, mailed on Jan. 27, 2011.
(Continued)

*Primary Examiner* — Huy D Vu
*Assistant Examiner* — Bao G Nguyen
(74) *Attorney, Agent, or Firm* — Oppedahl Patent Law Firm LLC

(57) ABSTRACT

The disclosure discloses a method for controlling Machine Type Communication (MTC) equipment to access network, wherein an access grade is set for an MTC equipment or an MTC group, and corresponding access parameters are set for the MTC equipment or MTC group according to the access grade, wherein the method comprises the steps of: notifying or configuring the access parameters to the MTC equipment and initiating, by the MTC equipment, an access request according to the access parameters; or, an access priority is configured for the MTC equipment or MTC group, wherein the method comprises the steps of: acquiring by the network side the access priority of the MTC equipment or MTC group after the network side receives the access request from the MTC equipment, and performing an access control on the MTC equipment according to the current network load. The disclosure further discloses a system for implementing the method. The disclosure can ensure that the service load of the Core Network (CN) side is controlled within a certain range, thus avoiding impact on the services that have currently accessed the network. The disclosure is especially applicable to communication systems with Machine To Machine (M2M) mechanism.

13 Claims, 3 Drawing Sheets

(51) Int. Cl.
*H04W 74/08* (2009.01)
*H04W 4/00* (2009.01)
*H04W 4/08* (2009.01)
*H04W 8/18* (2009.01)
*H04W 28/18* (2009.01)
*H04W 74/00* (2009.01)
*H04W 48/12* (2009.01)

(52) U.S. Cl.
CPC ............... *H04W 4/08* (2013.01); *H04W 8/18* (2013.01); *H04W 28/18* (2013.01); *H04W 48/12* (2013.01); *H04W 74/004* (2013.01)

(56) References Cited

U.S. PATENT DOCUMENTS

| | | |
|---|---|---|
| 2007/0169107 A1 | 7/2007 | Huttunen |
| 2008/0153521 A1* | 6/2008 | Benaouda et al. ............ 455/466 |
| 2010/0146117 A1 | 6/2010 | Hoeksel |
| 2010/0157887 A1* | 6/2010 | Kopplin ....................... 370/328 |
| 2011/0199905 A1 | 8/2011 | Pinheiro |

FOREIGN PATENT DOCUMENTS

| | | |
|---|---|---|
| EP | 2192807 A1 | 6/2010 |
| JP | 2001352573 A | 12/2001 |
| JP | 2007201581 A | 8/2007 |
| WO | 2011100540 A1 | 8/2011 |

OTHER PUBLICATIONS

English Translation of the Written Opinion of the International Search Authority in international application No. PCT/CN2010/076336, mailed on Jan. 27, 2011.
Supplementary European Search Report in European application No. 10849719.9, mailed on Jan. 24, 2014, 11 total pages.
3GPP TSG SA WG2 Meeting #77, MTC Signal Congestion Control, Samsung, Shenzhen, China, Jan. 18, 2010.
MTC Time Tolerant Feature Feb. 2010.

* cited by examiner

METHOD AND SYSTEM FOR CONTROLLING MACHINE TYPE COMMUNICATION EQUIPMENT TO ACCESS NETWORK

TECHNICAL FIELD

The disclosure relates to an access control technology, in particular to a method and a system for controlling Machine Type Communication (MTC) equipment to access a network.

BACKGROUND

FIG. 1 shows a structure diagram of a cellular wireless communication system; as shown in FIG. 1, the cellular wireless communication system mainly consists of a Core Network (CN), a Radio Access Network (RAN) and terminals. The CN is responsible for non-access layer affairs such as terminal location update; in addition, the CN is also the anchor point of the user plane. The RAN comprises base stations, or comprises base stations and a base station controller, wherein the access network is in charge of access layer affairs such as management of radio resources; depending on actual situations, there might exist physical or logical connections between base stations, for example, the connections between base station 1 and base station 2, as well as between base station 1 and base station 3 as shown in FIG. 1; in addition, each base station can be connected with one or more CN nodes. The terminal, i.e., the User Equipment (UE), refers to various devices capable of communicating with the cellular wireless communication network, such as a mobile phone or a laptop computer.

A MTC service is a machine to machine communication service. In the MTC service, human participation is not needed and all communications are automatically performed by machines; the MTC service obtains data through sensing devices such as a sensor, then reports the data to a mobile communication network through a communication module and accesses a public data network through the mobile communication network. Specifically, the MTC service can be applied to logistics supervising, security monitoring, remote medical detection, remote meter reading, etc. The data is managed by a special server of a mobile operator or dedicated MTC operator, and can be provided for view by an MTC user or MTC manager. During this process, the device acquiring the data needed by the service is the MTC equipment.

In the MTC service, some features distinct from the conventional mobile communication are introduced, for example, the feature of group management. When this feature is activated, the MTC equipments of the same user may be classified into one group; the network can uniformly configure parameters for the whole group. The parameters apply to all MTC equipments belonging to this group; the operator sets and activates the group management feature in the subscription information of the MTC equipment and stores the group management feature into a Home Subscriber Server (HSS). The HSS is an entity in charge of saving the identity information, authentication information and authorization information of a user or terminal equipment in the telecommunication network. depending on different circumstances, the HSS can be used to save the identity information of the user and the binding information of the user and the terminal equipment, or only the identity information of the user (specifically, the binding information of the user and the terminal equipment can be saved by a gateway, or directly save the identify information of the terminal equipment. The HSS is further in charge of a subscription database of users, user identity verification and authorization, and so on. The service platform can inquire the user or terminal information from the HSS.

When the MTC equipment is attached to a network, a Mobility Management Entity (MME) obtains the subscription information of the MTC equipment from the HSS and saves the information locally. The MME is an entity configured to manage the user terminal control signaling in the CN and is in charge of access control, including authentication control, identifier (for example, Globally Unique Temporary Identity (GUTI), Tracking Area Identity (TAI)) assignment, authentication of user identifier and equipment identifier, signaling plane encryption, consistency protection between eNBs, conversion of security parameters and Quality of Service (QoS) parameters between 2G/3G and Evolved Packet System (EPS), access permission control, decision on whether the requested resource can be obtained and reserved, legal monitoring, mobility management (tracking and recording of the current UE location), session management, related operations for EPS bearer, network element selection, etc.

After the MTC technology is introduced, there might exist a large number of MTC equipments; when the large number of MTC equipments all need to access the network to accept services, network congestion might occur due to overly large amount of signaling being initiated simultaneously, impacting the services for other terminals connected to the network.

SUMMARY

In view of the above, the main object of the disclosure is to provide a method and a system for controlling MTC equipment to access network, which can control the number of the MTC equipments accessing the network and thus prevent overload of the network.

In order to achieve the object above, the technical scheme of the disclosure is realized by:

a method for controlling Machine Type Communication (MTC) equipment to access network, in which an access grade or an access priority is set for an MTC equipment or an MTC group or an MTC service, and a corresponding access parameter is configured by the network according to the access grade or the access priority. The method includes:

notifying the access parameter to the MTC equipment or the MTC group or configuring the access parameter onto the MTC equipment or the MTC group;

initiating, by the MTC equipment or the MTC group, an access request according to the access parameter.

Preferably, the access parameter may include an access probability or/and a waiting time.

Preferably, the step of initiating by the MTC equipment or the MTC group the access request according to the access parameter may include:

generating, by the MTC equipment or the MTC group, a random number randomly before initiating the access request, and comparing the random number with the access probability of the MTC equipment or the MTC group, when the random number is less than or not greater than the access probability, initiating the access request, otherwise, the access request is not initiated; when the access parameter contains the waiting time, regenerating a random number after the waiting time expires, and comparing the regenerated random number with the access probability, when the regenerated random number is less than or not greater than the access probability, initiating the access request; when the access parameter does not contain the waiting time, not initiating the access request any more.

Preferably, according to the access grade or the access priority, the corresponding access parameter may be configured such that the higher the access grade or the access priority is, the greater the configured access probability is.

Preferably, the step of initiating by the MTC equipment or the MTC group the access request according to the access parameter may include:

generating, by the MTC equipment or the MTC group, a random number randomly before initiating the access request, and comparing the random number with the access probability of the MTC equipment or the MTC group, when the random number is greater than or not less than the access probability, initiating the access request, otherwise, the access request is not initiated; when the access parameter contains the waiting time, regenerating a random number after the waiting time expires, and comparing the regenerated random number with the access probability, when the regenerated random number is greater than or not less than the access probability, initiating the access request; and when the access parameter does not contain the waiting time, not initiating the access request any more.

Preferably, according to the access grade or the access priority, the corresponding access parameter may be configured such that the higher the access grade or the access priority is, the smaller the configured access probability is.

Preferably, the access probability may be a numerical range and the random number may be generated in the numerical range of the access probability.

Preferably, the access parameter may include an indication on whether access is allowed or/and a waiting time.

Preferably, the step of initiating by the MTC equipment or the MTC group the access request according to the access parameter may include:

not initiating the access request when the MTC equipment or the MTC group determines that access is not allowed according to the access grade or the access priority contained in its own access parameter, when the access parameter contains the waiting time, reinitiating the access request after the waiting time expires; when the access parameter does not contain the waiting time, not initiating the access request any more.

Preferably, the access request may be one of the following requests:

attachment request, connection request, Radio Resource Control (RRC) connection request, Track Area (TA) update request, Route Area (RA) update request and Packet Data Network (PDN) connection request.

Preferably, the step of notifying the access parameter to the MTC equipment or the MTC group may include:

notifying, by a network side, the access parameter to the MTC equipment or the MTC group by way of broadcast or signaling.

Preferably, the access grade or the access priority may be used as subscription data or may be preconfigured in the MTC equipment or the MTC group.

A method for controlling MTC equipment to access network, in which an access grade or an access priority is configured for an MTC equipment or an MTC group or an MTC service. The method includes:

acquiring, by a network side, the access grade or the access priority of the MTC equipment or the MTC group after the network side receives an access request from the MTC equipment or the MTC group, and performing access control on the MTC equipment or the MTC group according to current network load.

Preferably, the method may further include: setting a corresponding load threshold for the MTC equipment or the MTC group according to the access grade or the access priority.

Preferably, the step of performing the access control on the MTC equipment according to the current network load may include:

rejecting the access request of the MTC equipment or an MTC equipment in the MTC group with an access grade or an access priority not higher than the access grade or the access priority corresponding to the load threshold when the current network load reaches a certain load threshold.

Preferably, the step of acquiring the access grade or the access priority of the MTC equipment or the MTC group may include:

configuring the access priority onto the MTC equipment or the MTC group; reporting, by the MTC equipment or the MTC group, its access grade or access priority when initiating the access request; or storing, by the network side, the access grade or the access priority of the MTC equipment or the MTC group; determining, by the network side, the access grade or the access priority of the MTC equipment or the MTC group according to the identifier information which is contained in an access request initiated by the MTC equipment or the MTC group.

Preferably, the access request may be one of the following requests:

attachment request, connection request, service request, RRC connection request, TA update request, RA update request, and PDN connection request.

Preferably, the network side may notify an access parameter to the MTC equipment or the MTC group by way of broadcast or signaling.

Preferably, the access grade or the access priority may be used as subscription data or may be preconfigured in the MTC equipment or the MTC group.

A system for controlling MTC equipment to access network includes a network side, an MTC group and an MTC equipment. The system further includes a configuration unit, a notification unit and an initiation unit, in which the configuration unit is set at the network side, the initiation unit is set in the MTC equipment or the MTC group; wherein the configuration unit is configured to set an access grade or an access priority for the MTC equipment or the MTC group or an MTC service and set a corresponding access parameter for the MTC equipment or the MTC group according to the access grade or the access priority;

the notification unit is configured to notify the access parameter to the MTC equipment or the MTC group or set the access parameter onto the MTC equipment or the MTC group;

the initiation unit is configured to initiate an access request according to the access parameter.

Preferably, the access parameter may include an access probability or/and a waiting time; the system may further include a generation unit, a comparison unit, a determining unit and a waiting unit which are set in the MTC equipment or the MTC group, wherein the generation unit is configured to generate a random number randomly before the access request is initiated;

the comparison unit is configured to compare the random number with the access probability of the MTC equipment or the MTC group to which the generation unit belongs, when the random number is less than or not greater than the access probability, trigger the initiation unit, otherwise, trigger the determining unit;

the determining unit is configured to determine whether the access parameter contains the waiting time and trigger the waiting unit when the access parameter contains the waiting time;

the waiting unit is configured to retrigger the generation unit after the waiting time expires.

Preferably, the configuration unit may be further configured to set a greater access probability when the access grade is higher.

Preferably, the access parameter may include an access probability or/and a waiting time; the system may further include a generation unit, a comparison unit, a determining unit and a waiting unit which are set in the MTC equipment or the MTC group, wherein the generation unit is configured to generate a random number randomly before the access request is initiated;

the comparison unit is configured to compare the random number with the access probability of the MTC equipment or the MTC group to which the generation unit belongs, when the random number is greater than or not less than the access probability, trigger the initiation unit, otherwise, trigger the determining unit;

the determining unit is configured to determine whether the access parameter contains the waiting time and trigger the waiting unit when the access parameter contains the waiting time;

the waiting unit is configured to retrigger the generation unit after the waiting time expires.

Preferably, the configuration unit may be further configured to set a smaller access probability when the access grade is higher.

Preferably, the access parameter may include a waiting time or/and an indication on whether access is allowed; the system may further include a determining unit which is set in the MTC equipment or the MTC group. The determining unit is configured to not initiate the access request when determining that access is not allowed according to the access grade or the access priority contained in the access parameter of the MTC equipment or the MTC group to which the determining unit belongs, reinitiate the access request after the waiting time expires when the access parameter is further determined to contain the waiting time, and not initiate the access request any more when the access parameter does not contain the waiting time.

A system for controlling MTC equipment to access network includes a network side, an MTC group and an MTC equipment. The system further includes a configuration unit, a receiving unit, an acquisition unit and an access control unit which are set at the network side; wherein the configuration unit is configured to set an access grade or an access priority for the MTC equipment or the MTC group or an MTC service;

the receiving unit is configured to receive an access request sent by the MTC equipment;

the acquisition unit is configured to acquire the access grade or the access priority of the MTC equipment or the MTC group sending the access request;

the access control unit is configured to perform access control on the MTC equipment or MTC group according to current network load.

Preferably, the configuration unit may be further configured to set a corresponding load threshold for the MTC equipment or the MTC group according to the access grade or the access priority; the access control unit may be further configured to reject the access request of the MTC equipment or an MTC equipment in the MTC group with an access grade or an access priority not higher than the access grade or the access priority corresponding to the load threshold when the current network load reaches a certain load threshold.

In the disclosure, by setting a grade or a priority for a MTC equipment or a MTC group and performing access control according to the grade or the priority of the MTC equipment or the MTC group to which the MTC equipment belongs, the service load of the CN side is ensured to be controlled within a certain range, thus avoiding impact on services that has currently accessed the network. The disclosure is especially applicable to communication systems of Machine To Machine (M2M) mechanism.

DETAILED DESCRIPTION OF THE EMBODIMENTS

Figure 1:
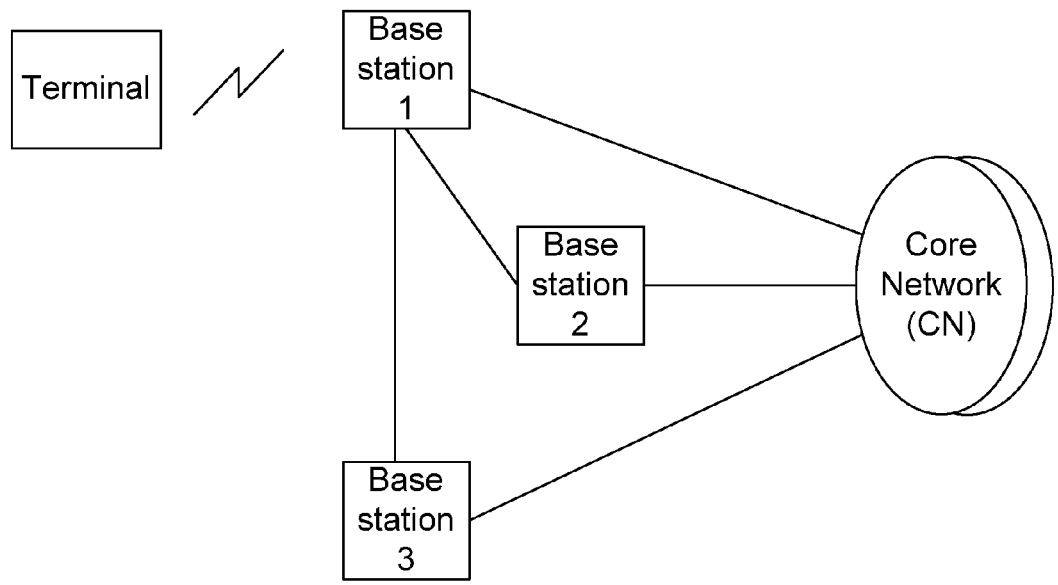
FIG. 1 shows a structure diagram of a cellular wireless communication system.

For a better understanding of the purpose, the technical scheme and the advantages of the disclosure, embodiments are provided below to further illustrate the disclosure in detail by reference to accompanying drawings.

Embodiment 1

A network operator assigns an access grade to the MTC equipment or MTC group, wherein the access grade can be preset in the MTC equipment or MTC group, or set in a user identification card for the MTC equipment, or can be saved in an HSS as subscription data.

In this disclosure, the access grade can be assigned according to the user requirement and be configured onto the MTC equipment or MTC group respectively according to the user requirement; or, the access grade can be assigned according to the type of a MTC service, that is, the access grade is assigned according to an Access Point Name (APN); in addition, the network operator can also set the access grade of the MTC equipment or MTC group according to its own management policy.

The access grade can be defined to have different priorities according to the order thereof, for example, when the access grade is set using numbers 0 to 9, it can be defined that the smaller the number corresponding to the access grade is, the higher the grade is; when the access grade is set using letters A through Z, it can be defined that the closer the letter corresponding to the access grade is towards the front of the alphabet, the higher the grade is; in addition, the priority order of each grade can also be set by the network, as long as the access grade can embody the access priorities of different MTC equipments or MTC groups.

The access grade can be set statically, that is, the access grade does not change after being set, for example, the access grade is directly configured in the MTC equipment or the identification card in the MTC equipment as mentioned above. In this disclosure, the access grade can also be set dynamically, that is, after a corresponding access grade is set, the network can adjust the access grade of different MTC equipments or MTC groups according to factors such as current network load and then notify an MTC equipment of the adjustment by way of broadcast or signaling.

Besides, the network side configures corresponding access parameters for different access grades; specifically, the access parameter includes an access probability and an access waiting time. Each access grade corresponds to one access probability and one access waiting time. The value of the access probability is in the range of 0 to 1. Here, the disclosure just controls the access of the MTC equipment by means similar to Probability; actually, the numerical range above can be any numerical range, for example, 1 to 100, 1 to 1000, etc.

The network sends the configured access parameter to the MTC equipment or MTC group by way of broadcast or signaling. If the network changes the access parameter, the network resends the changed access parameter to the MTC equipment or MTC group by way of broadcast or signaling.

The MTC equipment receives the broadcasted system message or signaling and reads access parameters from the message or signaling. If the MTC equipment has received the access parameter before, the MTC equipment overwrites the previous access parameter using the newly read access parameter.

In this disclosure, the access parameter above can also be configured in the MTC equipment or the identification card in the MTC equipment in the same way as the access grade.

Figure 2:
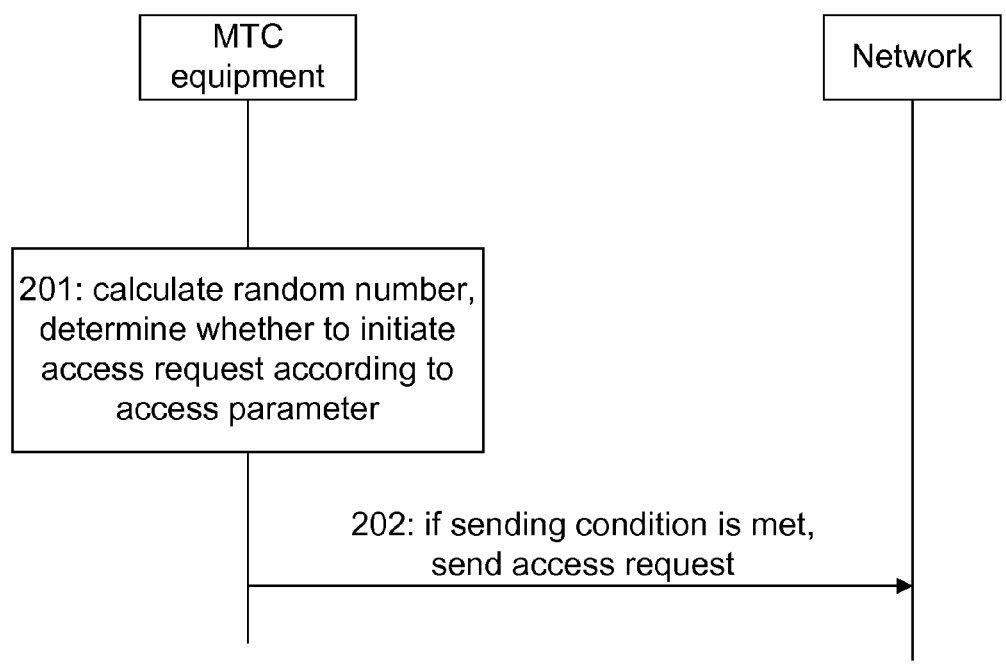
FIG. 2 shows a flowchart of Embodiment 1 of the method for controlling MTC equipment to access network according to the disclosure.

FIG. 2 shows a flowchart of Embodiment 1 of the method for controlling MTC equipment to access network according to the disclosure. As shown in FIG. 2, the method for controlling MTC equipment to access network in the embodiment comprises the following steps:

Step 201: when the MTC equipment or MTC group needs to access the network, the MTC equipment or MTC group first generates a random number randomly, wherein the numerical range of the random number is consistent with that of the access probability, for example, the access probability of 0 to 1 mentioned above; then the MTC equipment or MTC group compares the random number with the access probability corresponding to its own access grade in the access parameter, if the random number is less than or not greater than the access probability, Step 201 is executed; if the random number is greater than the access probability, access is not initiated, and the MTC equipment starts a timer T and sets the value of the T to be an access waiting time, when the set time of the timer expires, the MTC equipment repeats the access try, i.e., regenerates a random number and compares the random number with the access probability, with the same follow up process as the previous access process. If the access parameter does not contain a waiting time, the MTC equipment does not initiate the access request any more.

The comparison mode of the random number with the access probability is based on a mechanism that the higher the access grade is, the higher the value of the access probability configured for the access grade is. For example, when the access grade has 10 levels, the access probability of the top priority is set to be 1, followed by 0.9, 0.8, . . . , 0.1, etc.

Of course, the access probability can also be configured to have a smaller value if the access grade is higher. Thus, when the generated random number is greater than or not less than the access probability of the MTC equipment, an access request is allowed to initiate, otherwise, a random number is regenerated after a corresponding waiting time expires and access is tried again, wherein the implementation principle is the same as the above method, only the implementation details are different.

Step 202: an access request is initiated to the network side. The access request sent can be any one of the following: attachment request, connection request, service request, RRC connection request, TA update request, RA update request, and PDN connection request.

In this embodiment, access parameters are preferably dynamically configured. Thus, the network can dynamically change the access parameter according to load condition. When the load is heavy, the network can reduce the access probability of one or more access grades, or increase the access waiting time thereof; when the load is light, the network can increase the access probability of one or more access grades, or reduce the access waiting time thereof. When the network needs to forbid the access of the MTC equipment or MTC group with a certain grade, the network can set the access probability thereof to be 0.

Embodiment 2

A network assigns an access priority to the MTC equipment or MTC group, wherein the priority can be set as two levels including high level and low level, or three levels including high level, medium level and low level, or any other levels as needed by the network. The assigned access priority of the MTC equipment or MTC group can be saved in a network entity HSS as subscription data, or in a network entity MME.

After the access priority information is saved in a network entity, the network can find the corresponding priority according to the identifier of the MTC equipment or MTC group. When initiating an access request, the MTC equipment or MTC group generally needs to contain its own identifier in the request signaling; after receiving the identifier, the network entity can learn which priority the MTC equipment or MTC group has according to the identifier.

If the priority is set to have two levels including high level and low level, the network side presets two load threshold values, namely, S_High and S_Low, corresponding to high level and low level respectively; When the current network load exceeds the threshold value S_Low, the access request of the MTC equipment configured with low access priority is rejected; When the current network load exceeds the threshold value S_High, the access request of the MTC equipment configured with high access priority or low access priority is rejected;

if the priority is set to have three levels including high level, medium level and low level, the network presets three load threshold values, namely, S_High, S_Medium and S_Low, corresponding to high level, medium level and low level respectively; When the current network load exceeds the threshold value S_Low, the access request of the MTC equipment configured with low access priority is rejected; When the current network load exceeds the threshold value S_Medium, the access request of the MTC equipment configured with medium access priority or low access priority is rejected; When the current network load exceeds the threshold value S_High, the access request of the MTC equipment configured with high access priority, medium access priority, or low access priority is rejected.

No further description is needed for the case where the priority is set to have more levels, as it is analogous to the cases described above.

Or, the mapping relationship between the priorities and the network load threshold values can be set in a manner as follows:

if the priority is set to have two levels including high level and low level, the network side presets two load threshold values, namely, S_High and S_Low corresponding to high level and low level respectively; When the current network load exceeds the threshold value S_Low, the access request of the MTC equipment configured with low access priority is rejected; When the current network load exceeds the threshold value S_High, the access request of the MTC equipment configured with high access priority or low access priority is rejected;

if the priority is set to have three levels including high level, medium level and low level, the network presets three load threshold values, namely, S_High, S_Medium and S_Low, corresponding to high level, medium level and low level respectively; When the current network load exceeds the threshold value S_Low, the access request of the MTC equipment configured with low access priority is rejected; When the current network load exceeds the threshold value S_Medium, the access request of the MTC equipment configured with medium access priority or low access priority is rejected; When the current network load exceeds the threshold value S_High, the access request of the MTC equipment configured with high access priority, medium access priority, or low access priority is rejected.

No further description is needed for the case where the priority is set to have more levels, as it is analogous to the cases described above.

Figure 3:
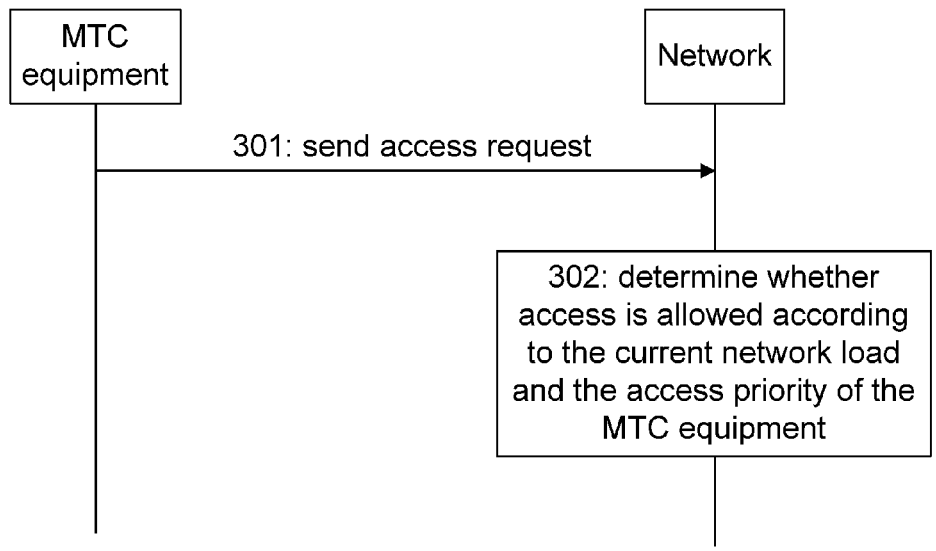
FIG. 3 shows a flowchart of Embodiment 2 of the method for controlling MTC equipment to access network according to the disclosure.

FIG. 3 shows a flowchart of Embodiment 2 of the method for controlling MTC equipment to access network according to the disclosure. As shown in FIG. 3, the method for controlling MTC equipment to access network in the embodiment comprises the following steps:

Step 301: the MTC equipment initiates an access request to the network side, wherein the access request sent can be any one of the following: attachment request, connection request, service request, RRC connection request, TA update request, RA update request, and PDN connection request. The access request contains the access priority information of the MTC equipment or the MTC group to which the MTC equipment belongs, or the access request contains the identifier information of the MTC equipment or the MTC group to which the MTC equipment belongs, wherein the identifier information contains the information of the identification module of the MTC equipment, or identifier information such as the identifying number of the MTC group.

Step 302: after receiving the access request from the MTC equipment, the network side acquires the access priority of the MTC equipment or the MTC group to which the MTC equipment belongs and determines whether to allow the access request to access the network according to current load.

Specifically, when the access request contains the access priority information of the MTC equipment or the MTC group to which the MTC equipment belongs, the network side can acquire the access priority directly. When the access request contains the identifier information of the MTC equipment or the MTC group to which the MTC equipment belongs, the network can find the access priority of the MTC equipment or the MTC group to which the MTC equipment belongs in the subscription data according to the identifier information.

After Step 302, if the network side rejects the access request of the MTC equipment, the network side can carry a waiting time for resending the access request in the request rejection signaling; after receiving the request rejection, the MTC equipment reinitiates the access request after the waiting time expires.

Embodiment 3

A network operator assigns an access priority to the MTC equipment or MTC group, wherein the access priority can be preset in the MTC equipment or MTC group, or set in a user identification card for the MTC equipment, as well as saved in an HSS as subscription data.

In this disclosure, the access priority can be assigned according to the user requirement and be configured onto the MTC equipment or MTC group respectively according to the user requirement; or, the access priority can be assigned according to the type of a MTC service, that is, the access priority is assigned according to an APN; in addition, the network operator can also set the access priority of the MTC equipment or MTC group according to its own management policy.

The access priority can be defined to have different priorities according to the order thereof, for example, when the access priority is set using numbers 0 to 9, it can be defined that the smaller the number corresponding to the access priority is, the higher the priority is; when the access priority is set using letters A through Z, it can be defined that the closer the letter corresponding to the access priority is towards the front of the alphabet, the higher the priority is.

The access priority can be set statically, that is, the access priority does not change after being set, for example, the access priority is directly configured in the MTC equipment or the identification card in the MTC equipment as mentioned above. In this disclosure, the access priority can also be set dynamically, that is, after a corresponding access priority is set, the network can adjust the access priority of different MTC equipments or MTC groups according to factors such as current network load and then notify an MTC equipment of the adjustment by way of broadcast or signaling.

Besides, the network side configures corresponding access parameters for different access priorities; specifically, the access parameter includes an access indication on whether access is allowed and an access waiting time; each access priority corresponds to an access indication and an access waiting time, or each access priority corresponds only to an access indication.

The network sends the configured access parameter to the MTC equipment or MTC group by way of broadcast or signaling. If the network changes the access parameter, the network resends the changed access parameter to the MTC equipment or MTC group by way of broadcast or signaling.

The MTC equipment receives the broadcasted system message or signaling and reads access parameters from the message or signaling. If the MTC equipment received the access parameter before, the MTC equipment overwrites the previous access parameter using the newly read access parameter.

In this disclosure, the access parameter above can also be configured in the MTC equipment or the identification card in the MTC equipment in the same way as the access priority.

Figure 4:
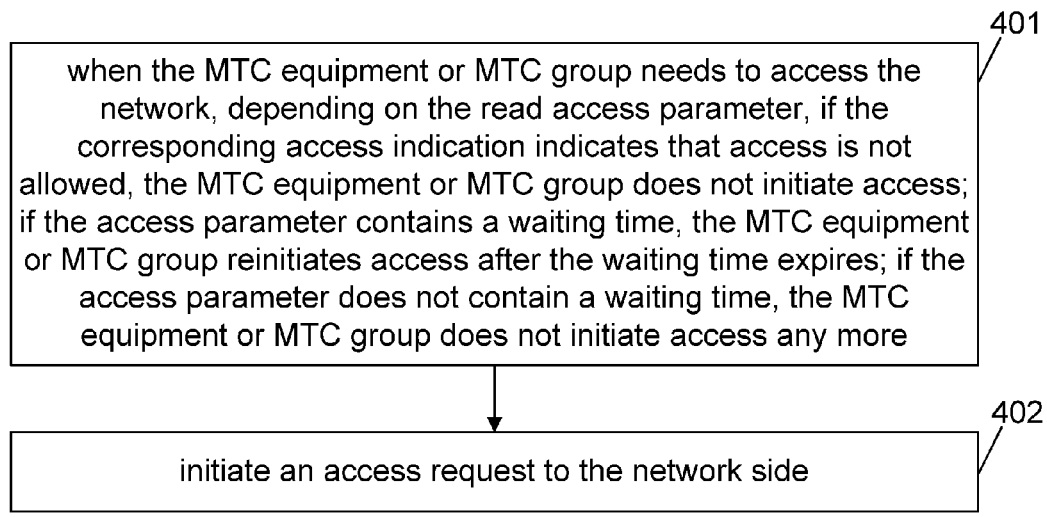
FIG. 4 shows a flowchart of Embodiment 3 of the method for controlling MTC equipment to access network according to the disclosure.

FIG. 4 shows a flowchart of Embodiment 3 of the method for controlling MTC equipment to access network according to the disclosure. As shown in FIG. 4, the method for controlling MTC equipment to access network in the embodiment comprises the following steps:

Step 401: when the MTC equipment or MTC group needs to access the network, depending on the read access parameter, when the corresponding access indication indicates that access is not allowed, the MTC equipment or MTC group does not initiate access; if the access parameter contains a waiting time, the MTC equipment or MTC group reinitiates access after the waiting time expires; if the access parameter does not contain a waiting time, the MTC equipment or MTC group does not initiate access any more.

Step 402: an access request is initiated to the network side. The access request sent can be any one of the following: attachment request, connection request, service request, RRC connection request, TA update request, RA update request, and PDN connection request.

In this embodiment, access parameters are preferably dynamically configured. Thus, the network can dynamically change the access parameter according to load condition. When the load is heavy, the network can adjust some priorities allowed to have access to be not allowed to have access; when the load is light, the network can adjust some priorities not allowed to have access to be allowed to have access.

Figure 5:
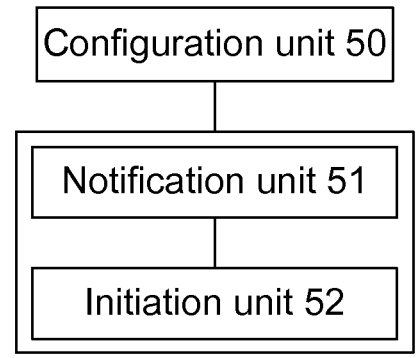
FIG. 5 shows a diagram of a composition structure of a system for controlling MTC equipment to access network according to the disclosure.

The system for controlling MTC equipment to access network in the embodiment comprises a network side, an MTC group and an MTC equipment, wherein the MTC equipment is connected to the network side through the network access node shown in FIG. 1; FIG. 5 shows a diagram of a composition structure of a system for controlling MTC equipment to access network according to the disclosure. As shown in FIG. 5, the system for controlling MTC equipment to access network in the embodiment further includes a configuration unit 50, a notification unit 51, and an initiation unit 52, wherein the configuration unit 50 is set at the network side, the notification unit 51 can be set at the network side or set in a dedicated configuration element such as a writer, the initiation unit 52 is set in the MTC equipment or MTC group; in which the configuration unit 50 is configured to set an access grade or access priority for the MTC equipment or MTC group or MTC service and configure a corresponding access parameter for the MTC equipment or MTC group according to the access grade or access priority;

the notification unit 51 is configured to notify or configure the access parameter to the MTC equipment or MTC group; and the initiation unit 52 is configured to initiate an access request according to the access parameter.

The access parameter includes an access probability or/and a waiting time; the system further comprises a generation unit, a comparison unit, a determining unit and a waiting unit set in the MTC equipment or MTC group, wherein the units are not shown in the figure; in which the generation unit is configured to generate a random number randomly before an access request is initiated;

the comparison unit is configured to compare the random number with the access probability of the MTC equipment or the MTC group to which the generation unit belongs and trigger the initiation unit when the random number is less than or not greater than the access probability, or otherwise trigger the determining unit;

the determining unit is configured to determine whether the access parameter contains a waiting time and trigger the waiting unit when the access parameter contains a waiting time; and the waiting unit is configured to retrigger the generation unit after the waiting time expires.

The configuration unit 50 is further configured to configure a greater access probability when the access grade is higher.

Or, the access parameter above includes an access probability or/and a waiting time; the system further comprises a generation unit, a comparison unit, a determining unit, and a waiting unit set in the MTC equipment or MTC group, wherein the units are not shown in the figure; in which the generation unit is configured to generate a random number randomly before an access request is initiated;

the comparison unit is configured to compare the random number with the access probability of the MTC equipment or the MTC group to which the generation unit belongs, trigger the initiation unit when the random number is greater than or not less than the access probability, or otherwise trigger the determining unit;

the determining unit is configured to determine whether the access parameter contains a waiting time and trigger the waiting unit when the access parameter contains a waiting time; and the waiting unit is configured to retrigger the generation after the waiting time expires.

In this way, the configuration unit 50 is further configured to configure a smaller access probability when the access grade is higher.

Or, the access parameter includes an indication on whether access is allowed or/and a waiting time; the system further comprises a determining unit (not shown in the figure) set in the MTC equipment or MTC group and configured to not initiate the access request when determining that access is not allowed according to the access grade or access priority in the access parameter of the MTC equipment or the MTC group to which the determining unit belongs, reinitiate the access request after a waiting time expires when determining that the access parameter contains the waiting time, and not initiate the access request any more when the access parameter does not contain a waiting time.

Those skilled in the art should understand that the system for controlling MTC equipment to access network shown in FIG. 5 is set for implementing the foregoing method; the implementation function of each processing unit in FIG. 5 can be understood by reference to the related description of the method shown in FIG. 2 and FIG. 4. The generation unit, comparison unit and waiting unit are all set for optimizing the technical scheme of the disclosure and are not the necessary technical features for realizing the basic purpose of the disclosure. The function of each processing unit included in the system shown in FIG. 5 can be implemented by a program running on a processor, or can be implemented by a specific logic circuit.

Figure 6:
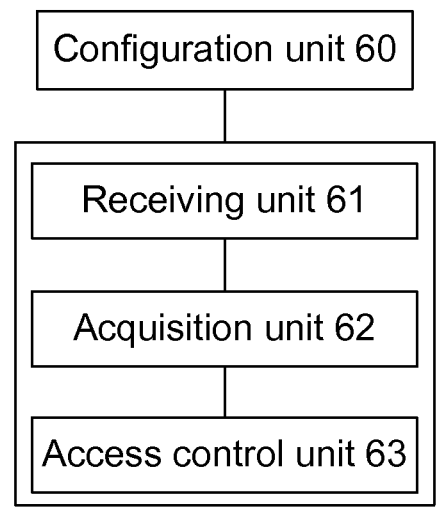
FIG. 6 shows a diagram of another composition structure of the system for controlling MTC equipment to access network according to the disclosure.

The system for controlling MTC equipment to access network in the embodiment comprises a network side and an MTC equipment, wherein the MTC equipment is connected to the network side through the network access node shown in FIG. 1; FIG. 6 shows a diagram of another composition structure of the system for controlling MTC equipment to access network according to the disclosure; as shown in FIG. 6, the system for controlling MTC equipment to access network in the embodiment further comprises a configuration unit 60, a receiving unit 61, an acquisition unit 62, and an access control unit 63 set at the network side, in which the configuration unit 60 is adapted to configure an access grade or an access priority for the MTC equipment or the MTC group or an MTC service;

the receiving unit 61 is configured to receive an access request sent from the MTC equipment;

the acquisition unit 62 is configured to acquire the access grade or access priority of the MTC equipment or MTC group sending the access request;

the access control unit 63 is configured to perform an access control on the MTC equipment or MTC group according to current network load.

The configuration unit 60 is further configured to set a corresponding load threshold for the MTC equipment or MTC group according to the access grade or access priority;

the access control unit is further configured to reject the access request of the MTC equipment or the MTC equipment in the MTC group with an access grade or access priority not higher than the access grade or the access priority corresponding to the load threshold when the current network load reaches a certain load threshold.

Those skilled in the art should understand that the system for controlling MTC equipment to access network shown in FIG. 6 is set for implementing the foregoing method; the implementation function of each processing unit in FIG. 6 can be understood by reference to the related description of the method shown in FIG. 3. The function of each processing unit included in the system shown in FIG. 6 can be implemented by a program running on a processor, or can be implemented by a specific logic circuit.

The above are only the preferred embodiments of the disclosure, and are not intended to limit the protection scope of the disclosure.

The invention claimed is:

1. A method for controlling Machine Type Communication (MTC) equipment to access network, in which an access grade or an access priority is set for an MTC equipment or an MTC group or an MTC service, and a corresponding access parameter is configured by the network according to the access grade or the access priority; the method comprising:
   notifying the access parameter to the MTC equipment or the MTC group or configuring the access parameter onto the MTC equipment or the MTC group;
   initiating, by the MTC equipment or the MTC group, an access request according to the access parameter;
   wherein the access parameter comprises an access probability or/and a waiting time; and the step of initiating by the MTC equipment or the MTC group the access request according to the access parameter comprises:
   generating, by the MTC equipment or the MTC group, a random number randomly before initiating the access request, and comparing the random number with the access probability of the MTC equipment or the MTC group, when the random number is less than or not greater than the access probability, initiating the access request, otherwise, the access request is not initiated;
   when the access parameter contains the waiting time, regenerating a random number after the waiting time expires, and comparing the regenerated random number with the access probability, when the regenerated random number is less than or not greater than the access probability, initiating the access request;
   when the access parameter does not contain the waiting time, not initiating the access request any more.

2. The method according to claim 1, wherein according to the access grade or the access priority, the corresponding access parameter is configured such that the higher the access grade or the access priority is, the greater the configured access probability is.

3. A method for controlling Machine Type Communication (MTC) equipment to access network, in which an access grade or an access priority is set for an MTC equipment or an MTC group or an MTC service, and a corresponding access parameter is configured by the network according to the access grade or the access priority; the method comprising:
   notifying the access parameter to the MTC equipment or the MTC croup or configuring the access parameter onto the MTC equipment or the MTC group;
   initiating, by the MTC equipment or the MTC group, an access request according to the access parameter;
   wherein the access parameter comprises an access probability or/and a waiting time; and the step of initiating by the MTC equipment or the MTC group the access request according to the access parameter comprises:
   generating, by the MTC equipment or the MTC group, a random number randomly before initiating the access request, and comparing the random number with the access probability of the MTC equipment or the MTC group, when the random number is greater than or not less than the access probability, initiating the access request, otherwise, the access request is not initiated;
   when the access parameter contains the waiting time, regenerating a random number after the waiting time expires, and comparing the regenerated random number with the access probability, when the regenerated random number is greater than or not less than the access probability, initiating the access request;
   when the access parameter dose not contain the waiting time, not initiating the access request any more.

4. The method according to claim 3, wherein according to the access grade or the access priority, the corresponding access parameter is configured such that the higher the access grade or the access priority is, the smaller the configured access probability is.

5. The method according to claim 1, wherein the access parameter comprises an indication on whether access is allowed or/and a waiting time.

6. The method according to claim 5, wherein the step of initiating by the MTC equipment or MTC group the access request according to the access parameter comprises:
   not initiating the access request when the MTC equipment or the MTC group determines that access is not allowed according to the access grade or the access priority contained in its own access parameter,
   when the access parameter contains the waiting time, reinitiating the access request after the waiting time expires;
   when the access parameter does not contain the waiting time, not initiating the access request any more.

7. The method according to claim 1, wherein the access request is one of the following requests:
   attachment request, connection request, service request, Radio Resource Control (RRC) connection request, Track Area (TA) update request, Route Area (RA) update request and Packet Data Network (PDN) connection request.

8. The method according to claim 7, wherein the step of notifying the access parameter to the MTC equipment or the MTC group comprises:
   notifying, by a network side, the access parameter to the MTC equipment or the MTC group by way of broadcast or signaling.

9. The method according to claim 7, wherein the access grade or the access priority is used as subscription data or is preconfigured in the MTC equipment or the MTC group.

10. A method for controlling MTC equipment to access network, in which an access grade or an access priority is configured for an MTC equipment or an MTC group, the method comprising:
   acquiring, by a network side, the access grade or the access priority of the MTC equipment or the MTC group after receiving an access request from the MTC equipment or the MTC group, and performing access control on the MTC equipment or the MTC group according to current network load;
   wherein the method further comprises: setting a corresponding load threshold for the MTC equipment or the MTC group according to the access grade or the access priority, and the step of performing the access control on the MTC equipment according to the current network load comprises:
rejecting the access request of the MTC equipment or an MTC equipment in the MTC group with an access grade or an access priority not higher than the access grade or the access priority corresponding to the load threshold, when the current network load reaches a load threshold;
wherein the access request is one of the following requests: attachment request, connection request, service request, RRC connection request, TA update request, RA update request and PDN connection request, and wherein, the access grade or the access priority is preconfigured in the MTC equipment or the MTC group.

11. The method according to claim 10, wherein the step of acquiring the access grade or the access priority of the MTC equipment or the MTC group comprises:
configuring the access priority onto the MTC equipment or the MTC group; reporting, by the MTC equipment or MTC group, its access grade or access priority when initiating the access request; or
storing, by the network side, the access grade or the access priority of the MTC equipment or the MTC group; determining, by the network side, the access grade or the access priority of the MTC equipment or the MTC group according to identifier information which is contained in an access request initiated by the MTC equipment or the MTC group.

12. The method according to claim 10, wherein the network side notifies an access parameter to the MTC equipment or the MTC group by way of broadcast or signaling.

13. A system for controlling MTC equipment to access network which comprises a network side, an MTC group and an MTC equipment, the system further comprising a configuration unit, a notification unit and an initiation unit, wherein the configuration unit is set at the network side, the initiation unit is set in the MTC equipment or the MTC group; wherein
the configuration unit is configured to set an access grade or an access priority for the MTC equipment or the MTC group or an MTC service and set a corresponding access parameter for the MTC equipment or the MTC group according to the access grade or the access priority;
the notification unit is configured to notify the access parameter to the MTC equipment or the MTC group or set the access parameter onto the MTC equipment or the MTC group;
the initiation unit is configured to initiate an access request according to the access parameter;
wherein the access parameter comprises an access probability or/and a waiting time;
the system further comprising a generation unit, a comparison unit, a determining unit and a waiting unit which are set in the MTC equipment or the MTC group, wherein
the generation unit is configured to generate a random number randomly before the access request is initiated;
the comparison unit is configured to compare the random number with the access probability of the MTC equipment or the MTC group to which the generation unit belongs, when the random number is less than or not greater than the access probability, trigger the initiation unit, otherwise, trigger the determining unit;
the determining unit is configured to determine whether the access parameter contains the waiting time and trigger the waiting unit when the access parameter contains the waiting time;
the waiting unit is configured to retrigger the generation unit after the waiting time expires.

* * * * *